United States Patent
Mullin

(10) Patent No.: US 10,448,615 B1
(45) Date of Patent: Oct. 22, 2019

(54) PET TOYS WITH DEFENSIVE DEFLECTION CURVES

(71) Applicant: Make Ideas, LLC, La Jolla, CA (US)

(72) Inventor: Keith Alan Mullin, La Jolla, CA (US)

(73) Assignee: Make Ideas, LLC, La Jolla, CA (US)

( * ) Notice: Subject to any disclaimer, the term of this patent is extended or adjusted under 35 U.S.C. 154(b) by 343 days.

(21) Appl. No.: 15/619,423

(22) Filed: Jun. 9, 2017

Related U.S. Application Data

(60) Provisional application No. 62/348,321, filed on Jun. 10, 2016.

(51) Int. Cl.
*A01K 15/02* (2006.01)

(52) U.S. Cl.
CPC .................. *A01K 15/026* (2013.01)

(58) Field of Classification Search
CPC ..... A01K 15/026; A01K 15/025; A01K 15/02
See application file for complete search history.

(56) References Cited

U.S. PATENT DOCUMENTS

| | | |
|---|---|---|
| 1,006,182 A | 10/1911 | Cousin |
| 1,022,112 A | 4/1912 | Smith |
| 1,031,095 A | 7/1912 | Smith |
| 1,534,964 A | 4/1925 | Kahnweiler |
| 2,086,631 A | 7/1937 | Munro |
| 3,830,202 A | 8/1974 | Garrison |
| 4,907,537 A | 3/1990 | Shirk |
| RE34,352 E | 8/1993 | Markham |
| 5,367,986 A | 11/1994 | O'Rourke et al. |
| 5,553,570 A | 9/1996 | VanNatter, III et al. |
| 5,595,142 A | 1/1997 | Chill |
| 5,647,302 A | 7/1997 | Shipp |
| 5,792,470 A | 8/1998 | Baumgardner, Sr. |
| 5,799,616 A | 9/1998 | McClung, III |
| 5,819,690 A | 10/1998 | Brown |
| 5,832,877 A | 11/1998 | Markham |

(Continued)

FOREIGN PATENT DOCUMENTS

| | | |
|---|---|---|
| GB | 2253329 A | 9/1992 |

OTHER PUBLICATIONS

Indestructible Dog Bionic Bone dated Apr. 2, 2015 (accessed Jun. 6, 2017 via Internet Archive Wayback Machine (https://web.archive.org/)).

*Primary Examiner* — Kristen C Hayes
(74) *Attorney, Agent, or Firm* — Tillman Wright, PLLC; James D. Wright; David R. Higgins

(57) ABSTRACT

A hollow bone-type pet toy having defensive curves includes a body having a narrow mid-section and at least two hollow lobes extending therefrom. Each lobe tapers outward from the narrow mid-section to a wide end and has walls defining an inner cavity. In cross-section, each lobe wall is thinnest adjacent the narrow mid-section and tapers outward in thickness such that the wall is thickest at a distal end; at a distal end of an outer surface, the outer surface terminates in a defensive deflection curve that extends around a distal end of the wall; and at a distal end of an inner surface of each lobe wall, the inner surface terminates in the defensive curve. The defensive deflection curve is defined in two-dimensional space using a set of cubic Bézier curves. A pet's teeth are thus deflected by the distal ends of the walls when the pet bites the pet-toy.

13 Claims, 12 Drawing Sheets

(56) References Cited

U.S. PATENT DOCUMENTS

| | | |
|---|---|---|
| 5,853,757 A | 12/1998 | Durand et al. |
| 5,865,146 A * | 2/1999 | Markham ............ A01K 15/026 119/707 |
| 5,895,662 A | 4/1999 | Meyer |
| 5,965,182 A | 10/1999 | Lindgren |
| 6,050,224 A | 4/2000 | Owens |
| D431,886 S | 10/2000 | Owens |
| D432,741 S | 10/2000 | Owens |
| 6,148,771 A | 11/2000 | Costello |
| 6,186,096 B1 | 2/2001 | Miller |
| 6,217,408 B1 | 4/2001 | Willinger |
| 6,237,538 B1 | 5/2001 | Tsengas |
| 6,405,681 B1 | 6/2002 | Ward |
| 6,415,741 B2 | 7/2002 | Suchowski et al. |
| 6,427,634 B1 | 8/2002 | Mann |
| 6,439,166 B1 | 8/2002 | Markham |
| 6,484,671 B2 | 11/2002 | Herrenbruck |
| 6,526,912 B1 | 3/2003 | Ottoson |
| 6,601,539 B1 | 8/2003 | Snook |
| 6,609,944 B1 | 8/2003 | Viola |
| 6,623,328 B1 | 9/2003 | Theel |
| 6,634,318 B1 | 10/2003 | Rucker |
| 6,681,721 B1 | 1/2004 | Buschy |
| 6,688,258 B1 | 2/2004 | Kolesar |
| 6,840,197 B1 | 1/2005 | Trompke |
| D505,233 S | 5/2005 | Viola |
| 6,899,059 B1 | 5/2005 | Crane et al. |
| D513,816 S | 1/2006 | Crane et al. |
| 6,990,762 B1 | 1/2006 | Muday et al. |
| 7,144,293 B2 | 12/2006 | Mann et al. |
| 7,389,748 B2 | 6/2008 | Shatoff et al. |
| 7,426,903 B2 | 9/2008 | Simon |
| 7,600,488 B2 | 10/2009 | Mann |
| 7,644,684 B2 | 1/2010 | Ritchey |
| 7,762,214 B2 | 7/2010 | Ritchey |
| D626,706 S | 11/2010 | Ragonetti |
| 7,823,542 B2 | 11/2010 | Freeman |
| 8,225,747 B2 | 7/2012 | Markham et al. |
| 8,231,920 B2 | 7/2012 | Axelrod et al. |
| 8,413,612 B2 | 4/2013 | Smith |
| 8,479,687 B2 | 7/2013 | Anderson et al. |
| D688,012 S | 8/2013 | Canello et al. |
| 8,522,725 B1 | 9/2013 | Moore |
| 8,640,647 B2 | 2/2014 | Dotterer |
| D710,554 S | 8/2014 | Byrne |
| 8,875,662 B2 | 11/2014 | Angle et al. |
| 8,904,966 B2 | 12/2014 | Kolozsvari et al. |
| D721,210 S | 1/2015 | Diskin |
| 8,935,992 B2 | 1/2015 | Axelrod et al. |
| 9,027,512 B2 | 5/2015 | Prange et al. |
| 9,107,390 B1 | 8/2015 | Day |
| 9,498,433 B1 | 11/2016 | Mullin et al. |
| 2002/0139708 A1 | 10/2002 | Lien |
| 2003/0079693 A1 | 5/2003 | Jager |
| 2004/0244719 A1 | 12/2004 | Jager |
| 2005/0045115 A1 * | 3/2005 | Mann .................... A01K 15/026 119/711 |
| 2006/0260560 A1 | 11/2006 | Renforth et al. |
| 2008/0141948 A1 * | 6/2008 | Renforth .............. A01K 15/026 119/710 |
| 2009/0078214 A1 | 3/2009 | Mann |
| 2010/0224138 A1 | 9/2010 | Axelrod et al. |
| 2011/0256208 A1 | 10/2011 | Ling |
| 2012/0111284 A1 | 5/2012 | Berger |
| 2013/0036988 A1 | 2/2013 | Lai |
| 2013/0047932 A1 | 2/2013 | Salmon Hyder et al. |
| 2013/0092097 A1 | 4/2013 | Cooper |
| 2013/0142936 A1 | 6/2013 | Stern et al. |
| 2014/0345532 A1 | 11/2014 | Valle |
| 2015/0164047 A1 | 6/2015 | Watts et al. |
| 2015/0237829 A1 | 8/2015 | Tsengas |
| 2015/0373950 A1 | 12/2015 | Spring |
| 2016/0037751 A1 | 2/2016 | Byrne |
| 2016/0113243 A1 | 4/2016 | Mullin et al. |
| 2018/0263214 A1 * | 9/2018 | McMillan ............... A01K 15/02 |
| 2019/0133082 A1 * | 5/2019 | Becattini, Jr. ........ A01K 15/026 |

* cited by examiner

Bézier equations:

y: = 25.7253 (1-t)³ + 26.5863 * 3(1-t)² t + 23.3355 * 3(1-t)² + 17.4687 t³ x: = 38.1469 (1-t)³ + 42.8259 * 3(1-t)² t + 43.3120 * 3 (1-t)² + 45.5080 t³

Bézier equations:

x: = 59.6049 $(1-t)^3$ + 68.5686 * $3(1-t)^2$ t + 74.5537 * $3(1-t)^2$ + 66.6693 $t^3$ y: = 40.1974 $(1-t)^3$ + 42.0872 * $3(1-t)^2$ t + 23.0612 * $3(1-t)^2$ + 20.7629 $t^3$

| | | | | |
|---|---|---|---|---|
| $X_0$ = | 59.6049 | | $y_0$ = | 40.1974 |
| $X_1$ = | 68.5686 | | $y_1$ = | 42.0872 |
| $X_2$ = | 74.5537 | | $y_2$ = | 23.0612 |
| $X_3$ = | 66.6693 | | $y_3$ = | 20.7629 |

Bézier equations:

x: = 50.4355 $(1-t)^3$ + 57.2556 * $3(1-t)^2$ t + 66.5792 * $3(1-t)^2$ + 56.7791 $t^3$ y: = 26.7786 $(1-t)^3$ + 27.7267 * $3(1-t)^2$ t + 8.7196 * $3(1-t)^2$ + 6.4401 $t^3$

| | | | | |
|---|---|---|---|---|
| $X_0$ = | 50.4355 | | $y_0$ = | 26.7786 |
| $X_1$ = | 57.2556 | | $y_1$ = | 27.7267 |
| $X_2$ = | 66.5792 | | $y_2$ = | 8.7196 |
| $X_3$ = | 56.7791 | | $y_3$ = | 6.4401 |

Bézier equations:

x: = 44.0000 $(1-t)^3$ + 57.1951 * $3(1-t)^2$ t + 72.1087 * $3(1-t)^2$ + 53.000 $t^3$ y: = 27.6397 $(1-t)^3$ + 44.2080 * $3(1-t)^2$ t + 18.2645 * $3(1-t)^2$ + 14.9310 $t^3$

PET TOYS WITH DEFENSIVE DEFLECTION CURVES

CROSS-REFERENCE TO RELATED APPLICATION

The present application is a U.S. nonprovisional patent application of, and claims priority under 35 U.S.C. § 119(e) to, U.S. provisional patent application Ser. No. 62/348,321 filed Jun. 10, 2016, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to animal toys and more specifically it relates to pet toys with defensive deflection curves which are part of a pet toy's shape geometry to render a durable pet toy that is resistant to destructive bite and chew forces applied by canines (dogs) or felines (cats).

Background

It can be appreciated that pet toys (toys for animals) have been in use for years. Typically, pet toys are comprised of toys for animals, domesticated pets, dog toys, cat toys, dog chews, animal training devices and the like. These pet toys can be made of rubber, cloth, thermoplastic elastomers (TPE)/thermoplastic rubbers (TPR), plush, nylon, firehose material and so on. Such toys, when made with a flexible material such as rubber, TPE or TPR are generally round or spherical shaped. While these generic toys and devices may be suitable for the particular purpose to which they address, they are not as suitable for dogs that are powerful or heavy chewers. Such generic dog toys do not have defensive deflection curves which are part of the pet toy's shape geometry to render a durable pet toy that is resistant to destructive bite and chew forces applied by dogs.

A major problem with conventional pet toys, such as rubber bones, is that they get destroyed easily by powerful chewing dogs, such as German Shepherds, Pitbulls and Rottweilers. Another problem with conventional pet toys is they to do not have specific geometry that is designed to deflect the chew forces applied by animals such as dogs. Another problem with conventional pet toys is, in order to achieve higher durability, they are made with thicker cross sections which use more material and have higher resultant materials costs. Another problem with conventional pet toys is, in order to achieve higher durability, they may be made with expensive materials.

When dogs bite and chew on a dog toy, they will tend to focus on the edges of the toy, where the toy is thinnest and easiest to access, attack and chew. The dog will attempt to destroy and remove pieces of the toy by 'working' the edge with their teeth. Once the edge of the toy has been punctured or compromised, the dog may continue to destroy and remove additional pieces of the toy, using the compromised edge as a starting point.

Dogs typically bite, chew and work the edges of dog toys with their teeth, chewing the edge from various angles or attack angles. A dog can also bite and chew the edge of the toy with various teeth, including canines, incisors, premolars and molars, where each tooth has a different geometry. With different dog breeds and with different sized dogs within a breed, the shape geometry of teeth and jaws can greatly vary.

Dogs, depending on breed and size, also have different strengths and patterns in their biting and chewing and can apply different pressures and forces upon edges of toys. Bite strengths or the dogs chewing patterns may also be affected by the dog's physiological condition. A dog that is stressed, frustrated or not sufficiently exercised, may have more aggressive chews pattern and methods than a dog who is well-adjusted and relaxed.

As described herein there are different attack angles, teeth shapes, forces and use variables across the dogs who chew, use and play with dog toys. Resultant of the described variations in dog breed, size, teeth shapes, age, and strength, providing a dog toy that can withstand aggressive chew patterns requires specifically designed edges of the toy that can withstand dog chewing and variations thereof. A need exists for an apparatus primarily developed for the purpose of providing dog toys with defensive deflection curves that can be used to render a dog chew toy that is durable when being subjected to the chew and bite forces of a dog.

SUMMARY OF THE PRESENT INVENTION

Broadly defined, the present invention according to one aspect is a hollow bone-type pet toy having defensive curves, including: a body having a narrow mid-section and at least two hollow lobes extending therefrom; wherein each lobe tapers outward from the narrow mid-section to a wide end; wherein each lobe has walls defining an inner cavity; wherein, in cross-section: each lobe wall is thinnest adjacent the narrow mid-section and tapers outward in thickness such that the wall is thickest at a distal end of the respective lobe, at a distal end of an outer surface of each lobe wall, the outer surface terminates in a defensive deflection curve that extends around a distal end of the wall, and at a distal end of an inner surface of each lobe wall, the inner surface terminates in the defensive deflection curve such that the defensive deflection curve extends from the distal end of the inner surface around the distal end of the wall to the distal end of the outer surface; wherein the defensive deflection curve is defined in two-dimensional space using a set of cubic Bézier curves; and wherein, when a pet treat is placed in an inner cavity, teeth of a pet are deflected by the distal ends of the walls of the lobes when the pet bites the pet-toy while attempting to retrieve the pet treat from within the inner cavity.

In a feature of this aspect, in cross-section, the inner surface is a straight line that is tangential to the defensive deflection curve.

In another feature of this aspect, in cross-section, the outer surface defines a straight line that is tangential to the defensive deflection curve. In further features, in cross-section, the outer surface defines a straight line from adjacent the narrow mid-section to its termination in the defensive deflection curve; in cross-section: the straight line is a first straight line, the outer surface defines a second straight line from adjacent the narrow mid-section toward the distal end, and the first straight line intersects the second straight line at a point; in cross-section: the distal end of the of each lobe wall forms at least half of a circle having a diameter z, the second straight line, if extended, intersects the circle at a point, and the thickness of the outer surface at the point where the second straight line intersects the circle is defined as 2*y, wherein z=3*y; and/or the outer surface is broken up by indentations.

In another feature of this aspect, the inner cavities of the at least two hollow lobes are contiguous with each other.

In another feature of this aspect, the inner cavities of the at least two hollow lobes are separate from each other and not contiguous.

In another feature of this aspect, the body has four hollow lobes extending from the narrow mid-section.

In another feature of this aspect, the set of defensive deflection curves, defined in two-dimensional space, uses the following two cubic Bézier curves:

$$x: =59.6049(1-t)^3+68.5686*3(1-t)^2t+74.5537*3(1-t)^2+66.6693t^3$$

$$y: =40.1974(1-t)^3+42.0872*3(1-t)^2t+23.0612*3(1-t)^2+20.7629t^3$$

In another feature of this aspect, the set of defensive deflection curves, defined in two-dimensional space, uses the following two cubic Bézier curves:

$$x: =50.4355(1-t)^3+57.2556*3(1-t)^2t+66.5792*3(1-t)^2+56.7791t^3$$

$$y: =26.7786(1-t)^3+27.7267*3(1-t)^2t+8.7196*3(1-t)^2+6.4401t^3$$

In another feature of this aspect, the set of defensive deflection curves, defined in two-dimensional space, uses the following two cubic Bézier curves:

$$x: =44.0000(1-t)^3+57.1951*3(1-t)^2t+72.1087*3(1-t)^2+53.0000t^3$$

$$y: =27.6397(1-t)^3+44.2080*3(1-t)^2t+18.2645*3(1-t)^2+14.9310t^3$$

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
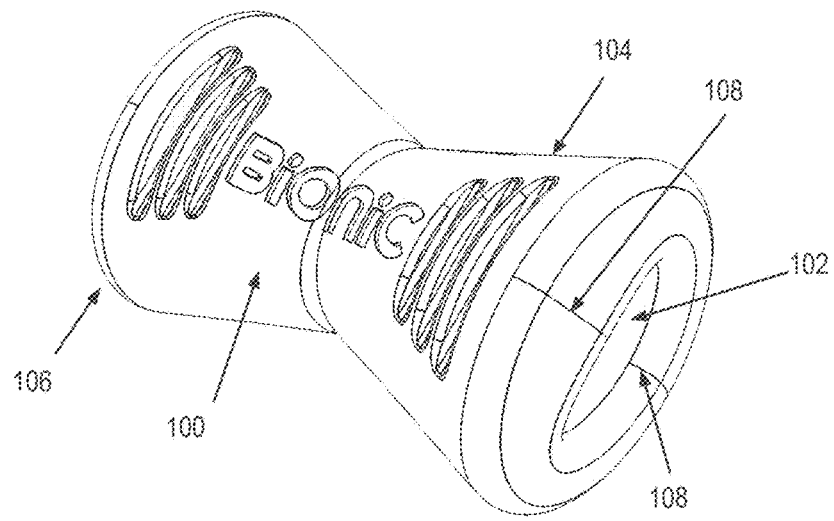
FIGS. 1 and 2 are an isometric view and front view of a first exemplary pet toy with defensive deflection curves, and may be considered representative of a pet toy designed using such defensive deflection curves, all in accordance with one or more preferred embodiments of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
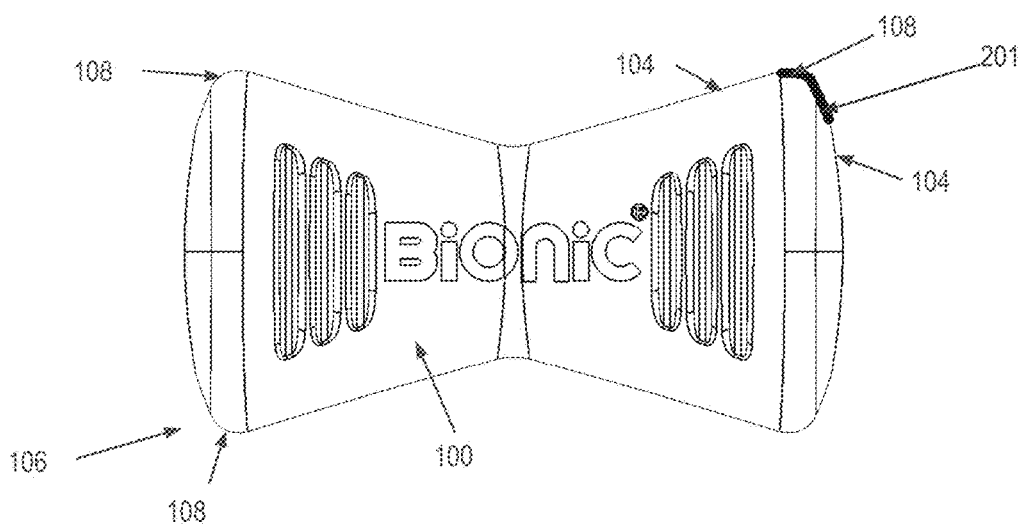

FIGS. 1 and 2 are an isometric view and front view of a first exemplary pet toy 10 with defensive deflection curves, and may be considered representative of a pet toy designed using such defensive deflection curves, all in accordance with one or more preferred embodiments of the present invention. As shown therein, the pet toy 10 includes a body 100, and a cavity 102. The body 100 is the main structural component of the toy 10 and thus creates the exterior perimeter of the toy. The body 100 can be made of a solid or flexible material, and in at least some embodiments may include a cloth, fabric or plush material and/or can be surfaced or textured with any designs such as peaks and valleys, wood grain, smooth or rough, or other suitable surfacing pattern. In preferred embodiments, the body 100 includes a narrow mid-section having two lobes extending therefrom, such that each lobe tapers outward from the narrow mid-section to a wide end. The pet toy 10 can have two or more such bodies connected in a semi-permanent or permanent manner.

Figure 3:
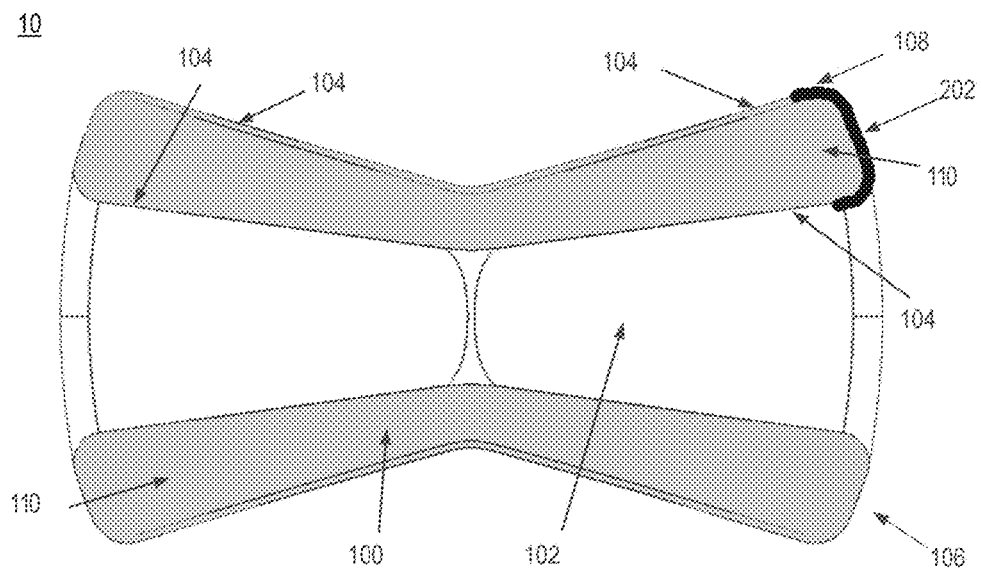
FIG. 3 is a top cross-sectional view of the pet toy of FIG. 1.
Figure 4:
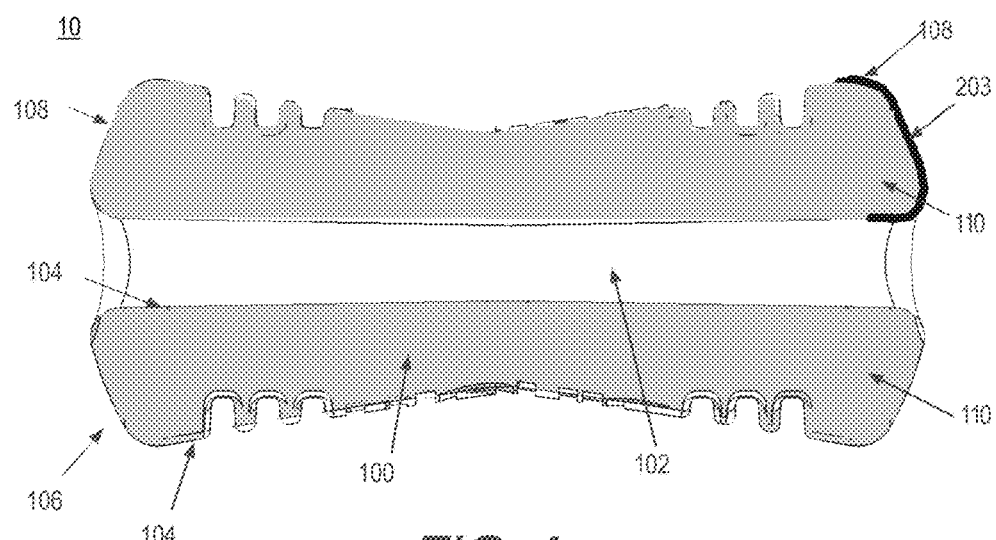
FIG. 4 is a front-cross-sectional view of the pet toy of FIG. 1.
Figure 5:
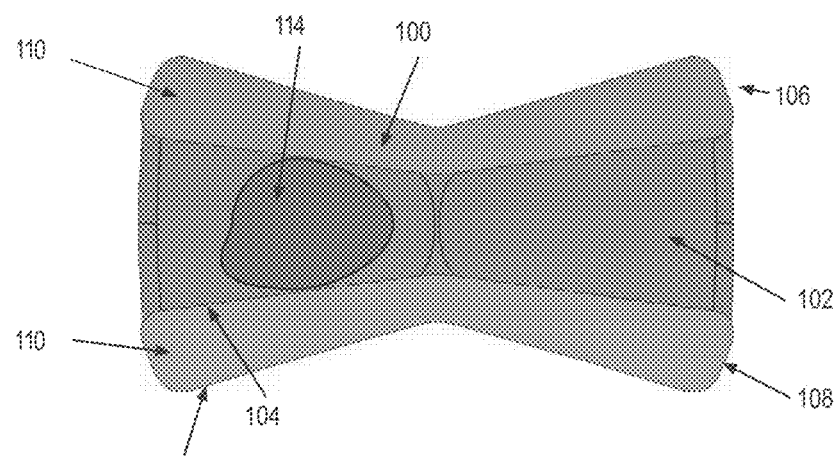
FIG. 5 is a top cross-sectional view of the pet toy of FIG. 1 wherein the cavity contains a pet treat.

FIG. 3 is a top cross-sectional view of the pet toy of FIG. 1, and FIG. 4 is a front-cross-sectional view of the pet toy of FIG. 1. As perhaps best shown therein, the interior cavity 102 is any interior space of the toy 10 and can be used as a container or storage container such as to hold food treats. Typically, the items placed inside the cavity 102 are items which an animal would like to possess or consume such as a food treat 114. In this regard, FIG. 5 is a top cross-sectional view of the pet toy of FIG. 1 wherein the cavity 102 contains a pet treat. The interior cavity 102 is surrounded by the body 100. In various embodiments, the cavity 102 can be smooth or have ridges or grooves which additionally retain the pet treat, and can have any shape suitable for holding or containing items stated herein or pet treat.

Figure 6:
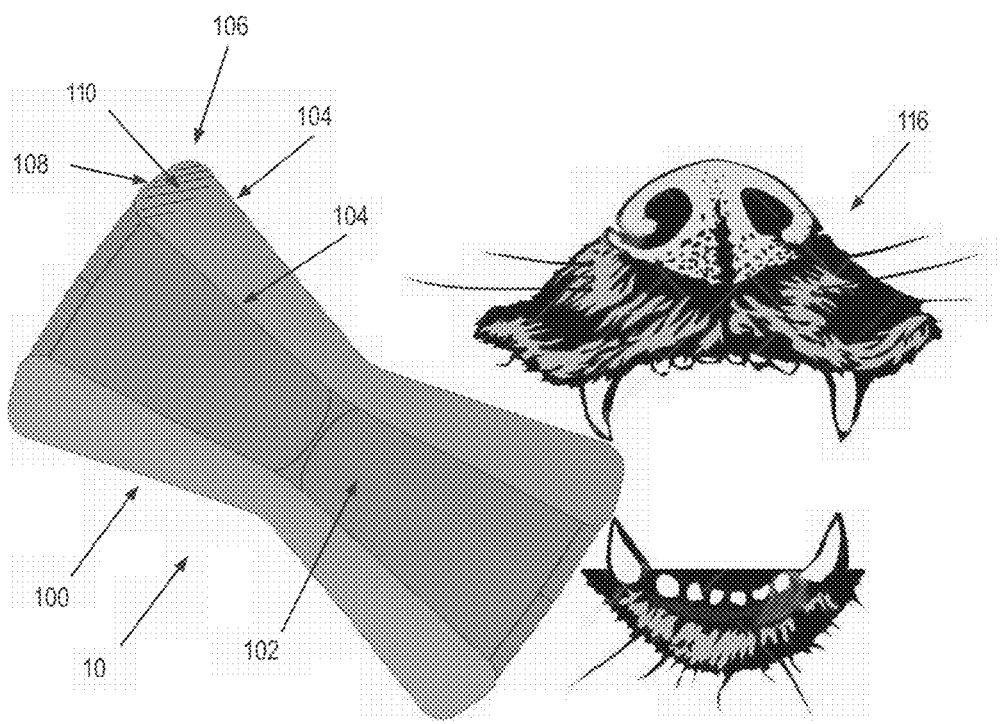
FIG. 6 is a top cross-sectional view of the pet toy of FIG. 1, shown in use by an animal.

The body 100 can also be produced in different sizes to accommodate various sizes of dogs, such as small, medium, large, and very large. FIG. 6 is a top cross-sectional view of the pet toy of FIG. 1, shown in use by an animal.

The exterior of the body 100 contains adjacent surfaces 104, defensive curves 108 and exterior edges 106. As shown in FIGS. 2, 3 and 4, adjacent surfaces 104 are on either side of the exterior edges 106. The adjacent surfaces 104 may define the limits of the body 100 surfaces. The adjacent surfaces 104 are tangential to the curve of the exterior edges 106, or put another way, the adjacent surfaces 104 are tangential to the exterior edges 106 at the point(s) where the adjacent surfaces 104 and the exterior edges 106 meet.

The exterior edges 106 are plane curves or face curves that define the limits of the body 100 at edge areas, where two or more adjacent surfaces 104 are adjacent. The exterior edges 106 can be vertices and can be curved or linear. The exterior edges 106 form defensive curves 108.

The defensive curves 108 are the geometric curve or shape of the exterior edge 106 when viewed in section. Defensive curves 108 can be a specific curve or a shape. The shape may be part of a circle, complex curve or the like. One such defensive curve 108 is highlighted in FIG. 3. The sectional views highlight the defensive curves 108 located at the ends of the toy which contain the areas where the animal is more prone to chew. More specifically, FIGS. 3, 5 and 6 highlight the section curve area 110, which is the cross-sectional profile of the exterior edges 106 located at the end of the body 100. The section curve area 110, creates an effectively thicker geometry thus providing more durability in the area most prone to chewing forces.

To achieve an optimal profile for the defensive curves 108, the defensive curves 108 are defined by using a set of cubic Bézier curves and parametric equations to define the specific pet toy geometry employed by the defensive curves 108. Three specific defensive curves 108 are highlighted in FIGS. 2, 3, and 4, respectively. In each case, a particularly smooth curve is employed that also provides a smooth transition to the adjacent surfaces 104. Do design the profile of each such curve 108, Bézier curves and parametric equations are employed. Most preferably, four control points are defined, and a cubic Bézier curve is employed.

Figure 7:
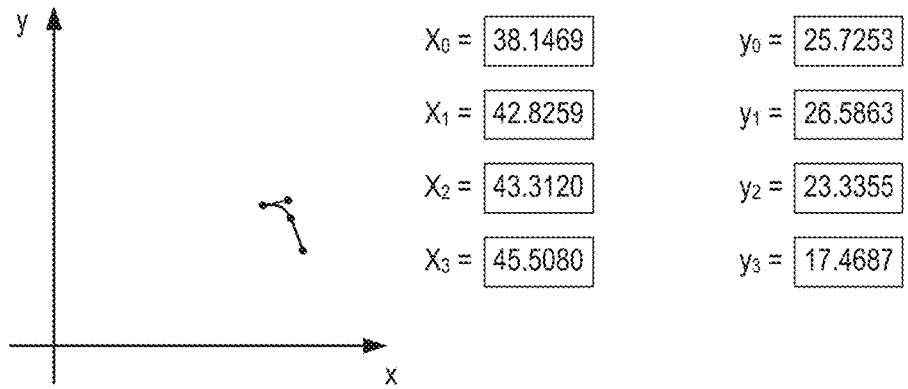
FIG. 7 is a set of parametric Bézier curve equations and graph image as they define defensive deflection curves of FIG. 2.

One such defensive curve 201 is highlighted, for example, in FIG. 2. As illustrated in FIG. 7, the four planar control points of the Bézier curve, which is located on an exterior edge 106 of the body 100, are:

$$x_0=38.1469, y_0=25.7253$$

$$x_1=42.8259, y_1=26.5863$$

$$x_2=43.3120, y_2=23.3355$$

$$x_3=45.5080, y_3=17.4687$$

The Bézier equations for this defensive curve 201, also shown in FIG. 7 are:

$$x: =38.1469(1-t)^3+42.8259*3(1-t)^2t+43.3120*3(1-t)^2+45.5080t^3$$

$$y: =25.7253(1-t)^3+26.5863*3(1-t)^2t+23.3355*3(1-t)^2+17.4687t^3$$

Figure 8:
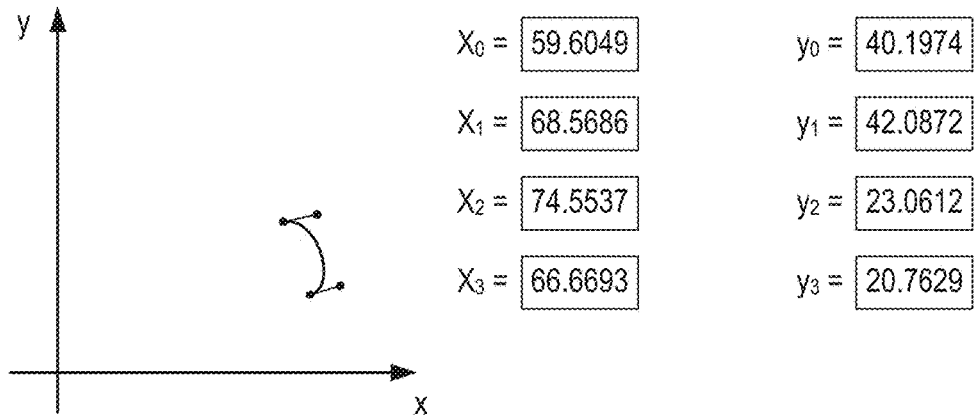
FIG. 8 is a set of parametric Bézier curve equations and graph image as they define defensive deflection curves of FIG. 3.

A second such defensive curve 202 is highlighted, for example, in FIG. 3. As illustrated in FIG. 8, the four planar control points of the Bézier curve, which is located on an exterior edge 106 of the body 100, are:

$$x_0=59.6049, y_0=40.1974$$

$$x_1=68.5686, y_1=42.0872$$

$$x_2=74.5537, y_2=23.0612$$

$$x_3=66.6693, y_3=20.7629$$

The Bézier equations for this defensive curve 202, also shown in FIG. 8, are:

$$x: =59.6049(1-t)^3+68.5686*3(1-t)^2t+74.5537*3(1-t)^2+66.6693t^3$$

$$y: =40.1974(1-t)^3+42.0872*3(1-t)^2t+23.0612*3(1-t)^2+20.7629t^3$$

Figure 9:
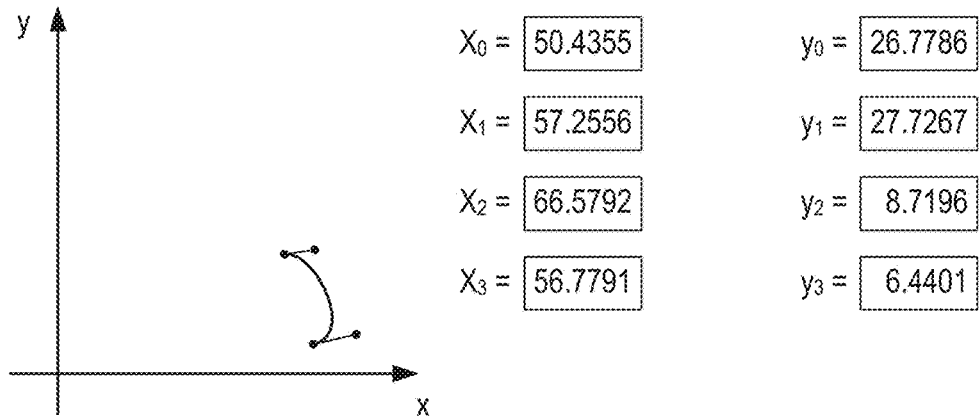
FIG. 9 is a set of parametric Bézier curve equations and graph image as they define defensive deflection curves of FIG. 4.

A third such defensive curve 203 is highlighted, for example, in FIG. 4. As illustrated in FIG. 9, the four planar control points of the Bézier curve, which is located on an exterior edge 106 of the body 100, are:

$$x_0=50.4355, y_0=26.7786$$

$$x_1=57.2556, y_1=27.7267$$

$$x_2=66.5792, y_2=8.7196$$

$$x_3=56.7791, y_3=6.4401$$

The Bézier equations for this defensive curve 203, also shown in FIG. 9, are:

$$x: =50.4355(1-t)^3+57.2556*3(1-t)^2t+66.5792*3(1-t)^2+56.7791t^3$$

$$y: =26.7786(1-t)^3+27.7267*3(1-t)^2t+8.7196*3(1-t)^2+6.4401t^3$$

Figure 10:
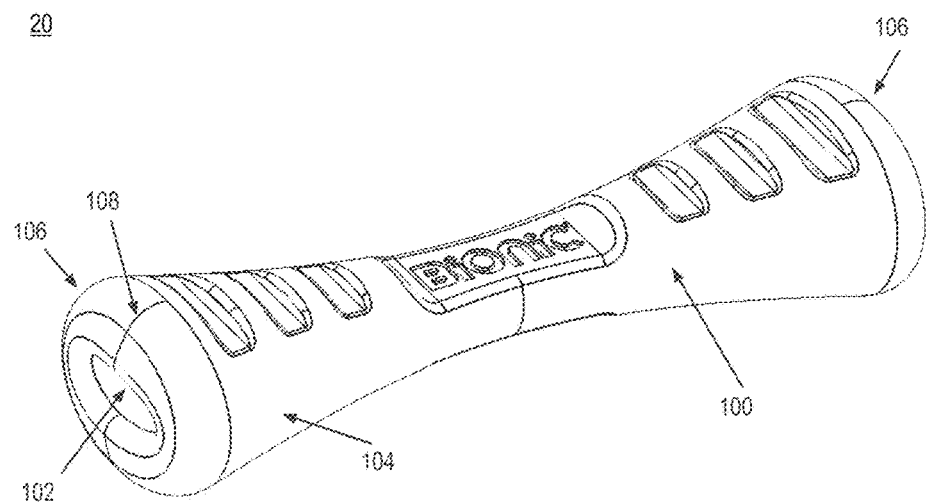
FIGS. 10 and 11 are an isometric view and a cross-sectional view, respectively, of a second exemplary pet toy with defensive deflection curves, and may be considered representative of a pet toy designed using such defensive deflection curves, all in accordance with one or more preferred embodiments of the present invention.
Figure 11:
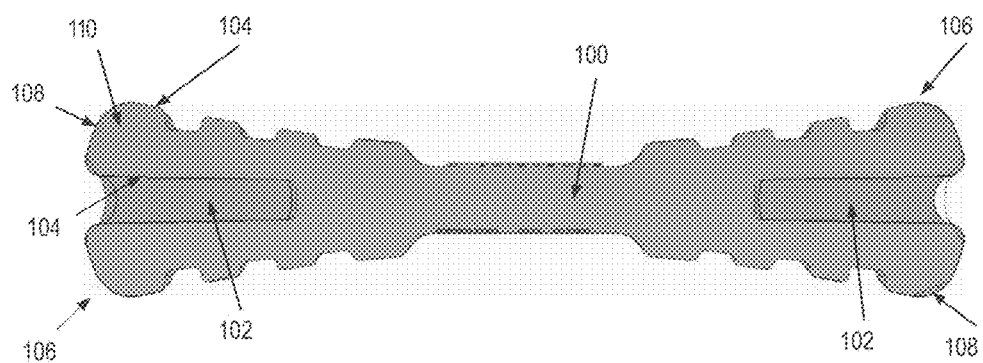

In some embodiments, there may be more than one cavity 102. FIGS. 10 and 11 are an isometric view and a cross-sectional view, respectively, of a second exemplary pet toy 20 with defensive deflection curves, and may be considered representative of a pet toy designed using such defensive deflection curves, all in accordance with one or more preferred embodiments of the present invention. As shown therein, the pet toy 20 includes a body 100, and two cavities 102. The body 100 is the main structural component of the toy 10 and thus creates the exterior perimeter of the toy. The exterior of the body 100 contains adjacent surfaces 104, defensive curves 108 and exterior edges 106 and section curve areas 110, all with the same purposes as described above.

Figure 12:
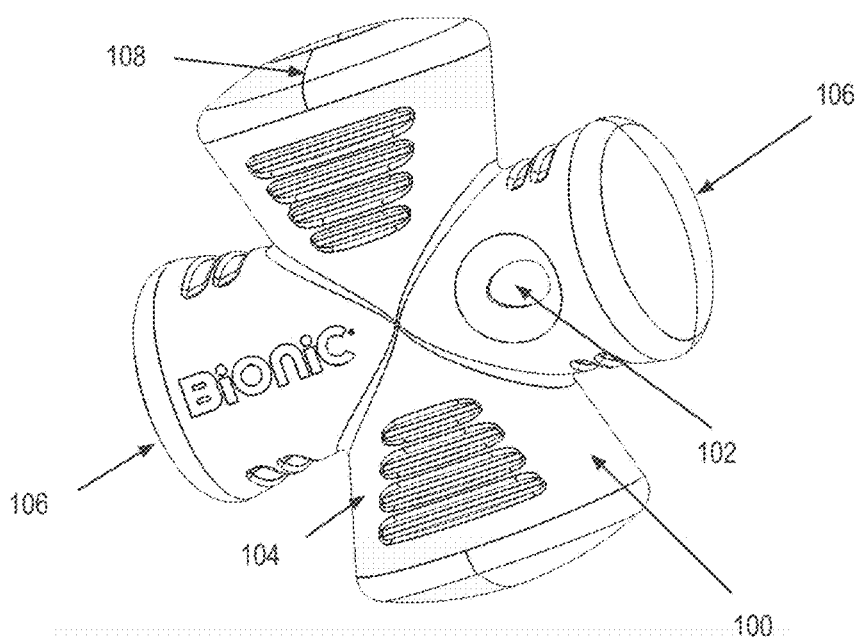
FIGS. 12 and 13 are an isometric view and a cross-sectional view, respectively, of a third exemplary pet toy with defensive deflection curves, and may be considered representative of a pet toy designed using such defensive deflection curves, all in accordance with one or more preferred embodiments of the present invention.
Figure 13:
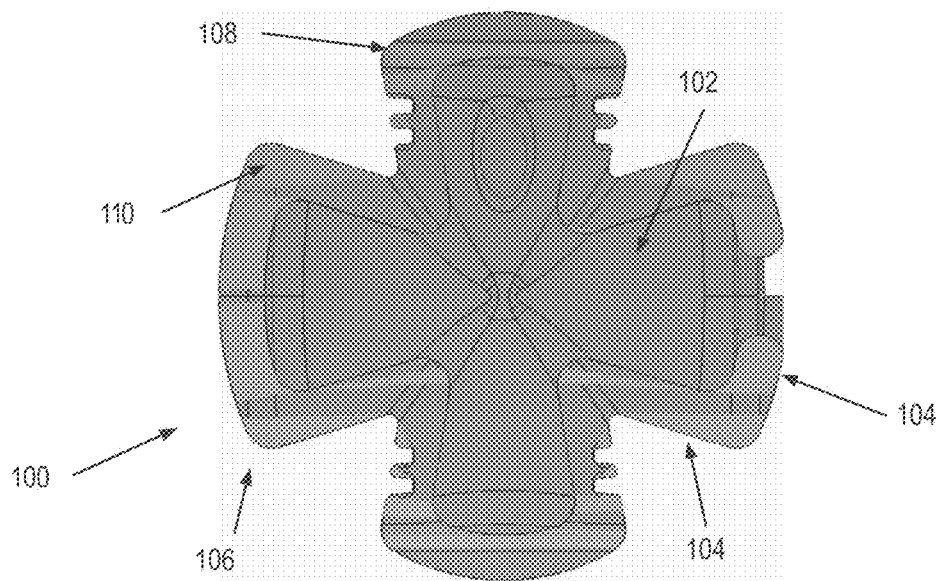

Other configurations are likewise possible for bone-type pet toys having wide ends tapering from a narrower center. For example, FIGS. 12 and 13 are an isometric view and a cross-sectional view, respectively, of a third exemplary pet toy 30 with defensive deflection curves, and may be considered representative of a pet toy designed using such defensive deflection curves, all in accordance with one or more preferred embodiments of the present invention. The pet toy 30 in FIGS. 12 and 13 is an X-shape pet toy 30. As shown therein, the pet toy 30 includes a body 100, and a cavity 102. The body 100 is the main structural component of the toy 10 and thus creates the exterior perimeter of the toy. The exterior of the body 100 contains adjacent surfaces 104, defensive curves 108 and exterior edges 106 and section curve areas 110, all with the same purposes as described above.

Figure 14:
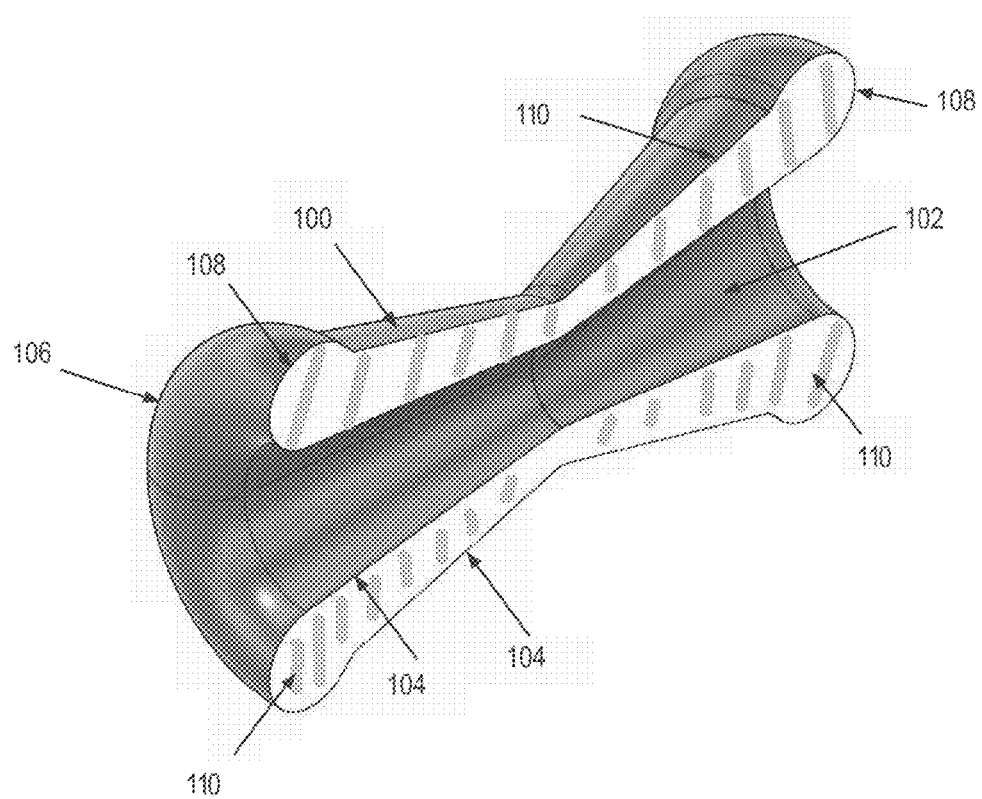
FIGS. 14 and 15 are views of a fourth exemplary pet toy with defensive deflection curves, and may be considered representative of a pet toy designed using such defensive deflection curves, all in accordance with one or more preferred embodiments of the present invention.
Figure 15:
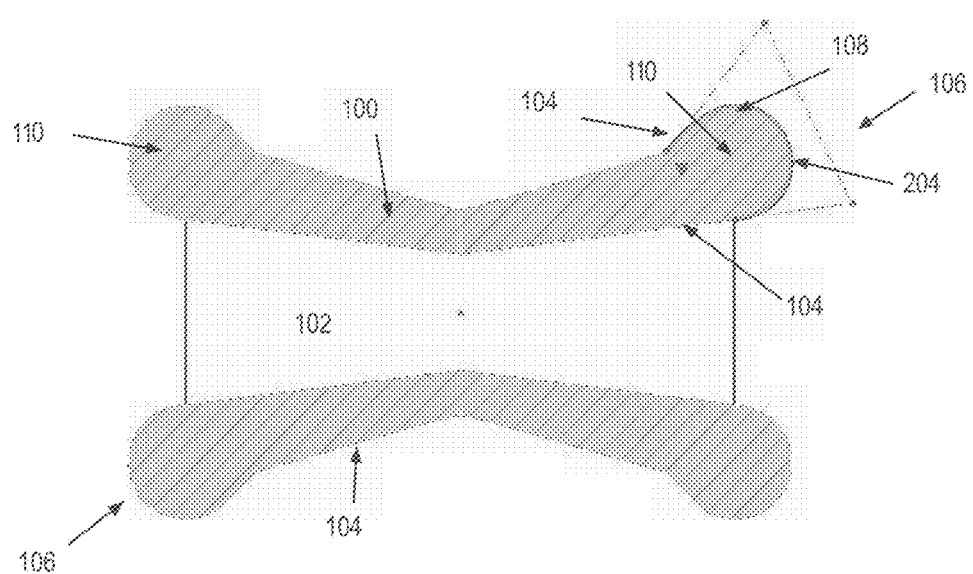
Figure 16:
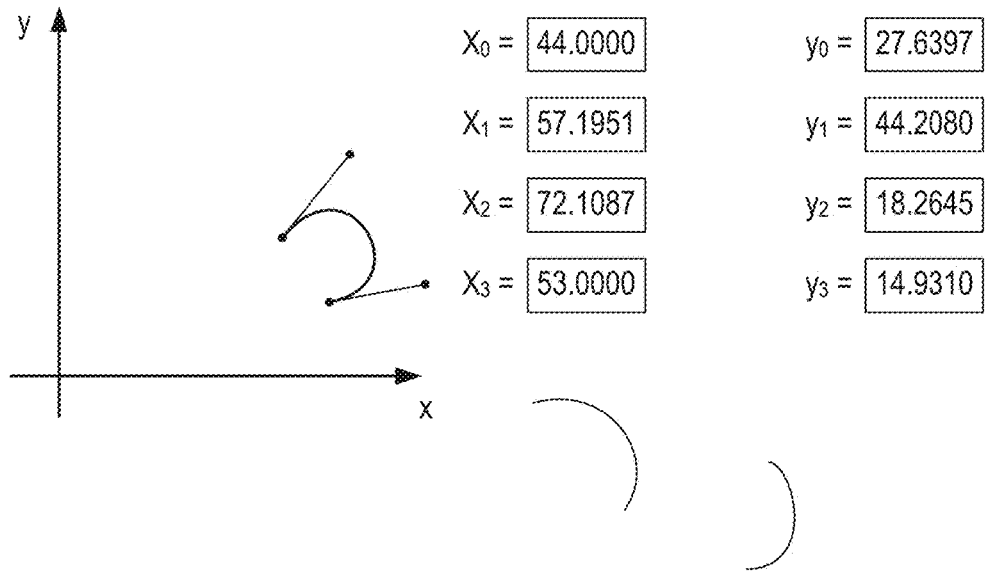
FIG. 16 is a set of parametric Bézier curve equations and graph image as they define defensive deflection curves of FIG. 15.

The above-described design methodology may also be used in combination with other design techniques to produce particularly suitable pet toys. In this regard, FIGS. 14 and 15 are views of a fourth exemplary pet toy 40 with defensive deflection curves, and may be considered representative of a pet toy designed using such defensive deflection curves, all in accordance with one or more preferred embodiments of the present invention. FIG. 14 is an isometric view of half of the toy 40, and FIG. 15 is a front cross-sectional view of the toy 40. A defensive curve 204 is highlighted in FIG. 15. As illustrated in FIG. 16, the four planar control points of the Bézier curve, which is located on an exterior edge 106 of the body 100, are:

$$x_0=44.0000, y_0=27.6397$$

$$x_1=57.1951, y_1=44.2080$$

$$x_2=72.1087, y_2=18.2645$$

$$x_3=53.0000, y_3=14.9310$$

The Bézier equations for this defensive curve 204, also shown in FIG. 16, are:

$$x: =44.0000(1-t)^3+57.1951*3(1-t)^2t+72.1087*3(1-t)^2+53.0000t^3$$

$$y: =27.6397(1-t)^3+44.2080*3(1-t)^2t+18.2645*3(1-t)^2+14.9310t^3$$

Figure 17:
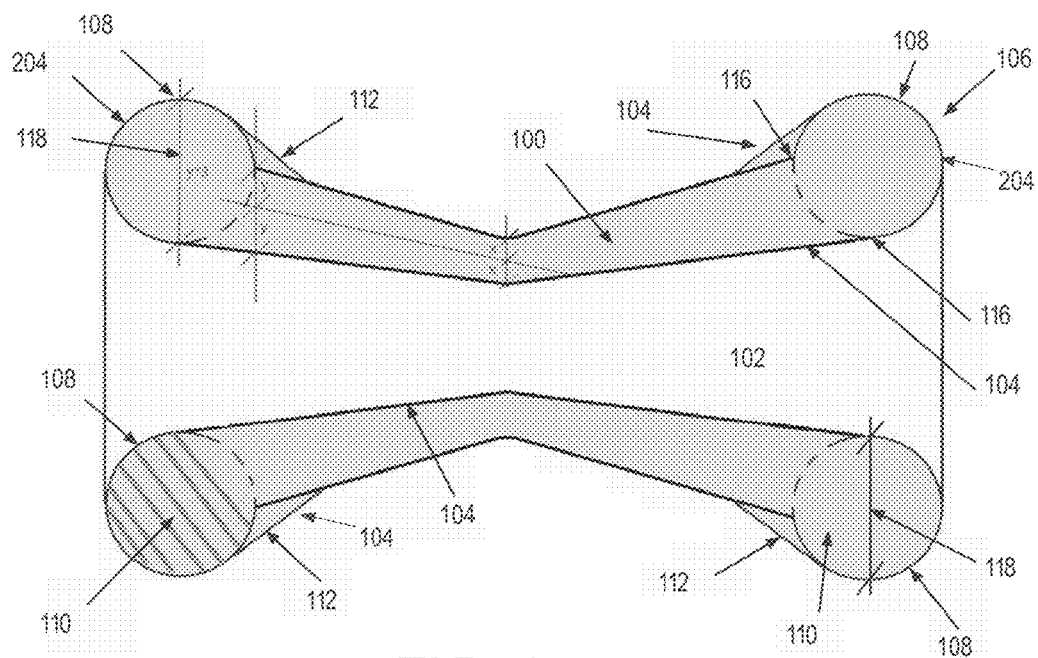
FIG. 17 is an enlarged cross-sectional view of the pet toy of FIGS. 14 and 15.
Figure 18:
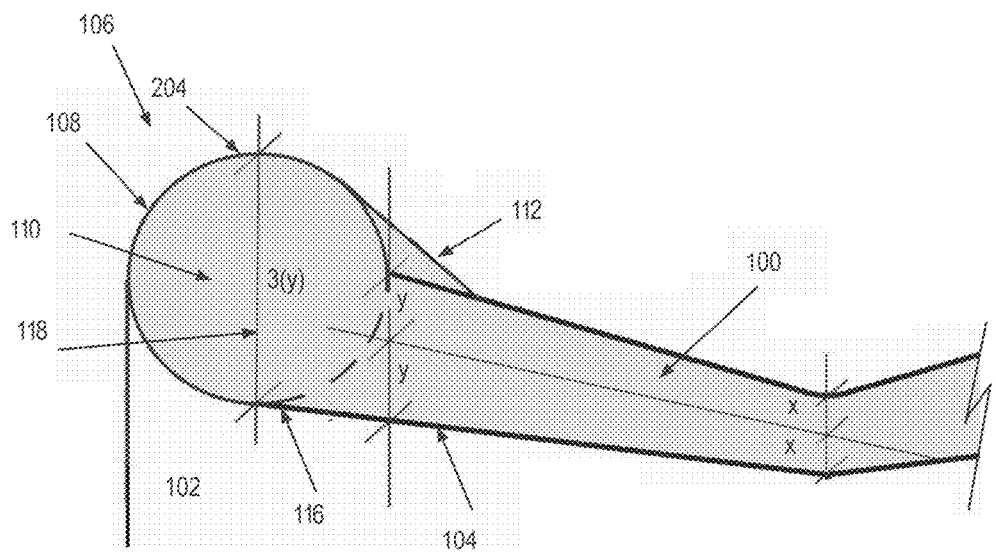
FIG. 18 is an enlarged fragmentary view of a portion of the pet toy of FIG. 17.

This pet toy 40 also illustrates the application of an additional design technique. In this regard, FIGS. 17 and 18 are an enlarged cross-sectional view of the pet toy 40 of FIGS. 14 and 15, and FIG. 18 is an enlarged fragmentary view of a portion of the pet toy 40 of FIG. 17. As particularly shown in FIGS. 17 and 18, the exterior edges 106 of the pet toy 40 have a cross-section which largely approximates a circle. Inward from that circle (i.e., toward the narrowest part of the bone-shaped toy), the wall of the body 100 tapers inward, and as it tapers inward, the wall gets thinner. Various geometric relationships are shown in FIGS. 17 and 18. In particular, the thickness of the wall at the center point of the toy is shown as being x+x, while the thickness of the wall at the widest point before the partially circular exterior edge 106 is shown as being y+y. This relationship is illustrated through use of a line that bisects the gradually-tapered wall, wherein the narrowest, centermost point in the wall has a half-thickness of x and a total thickness of x+x, while the opposite end of that wall has a half-thickness of y and a total thickness of y+y. The partially circular exterior edge 106, in turn, is shown as having a diameter of y*3. Put another way, "x" represents half the distance in thickness of the body 100 of the pet toy on its centerline; circle point 116 is the area of the body 100 where the defensive curve 204, defined by the formula below, meets adjacent surfaces 104; and "y" is half the section distance between the two adjacent plane surfaces 104. If "z" is defined as the diameter 118 of a circle that forms the defensive curve 204, then the equation for the diameter 118 that then defines the section curve area 110 and provides the defensive curve 204 is:

$$z=3(y)$$

As shown in the above equation which renders a circle with diameter 118 and defensive curve 204, the multiplier is shown as three (3). It is understood that this multiplier of (3) can be increased, or less preferably decreased, to achieve different dimensions for diameter 118. Multipliers such as 3.25, 3.31, 4, 4.5, or 5, etc. can also be used. Thus the equation for the diameter 118 could be z=3.25(y), z=3.31(y), z=4(y), z=4.5(y), z=5(y) or any multiplier appropriate for the use described herein. The most preferable multiplier is believed to be 3.

FIGS. 17 and 18 also show that there are tangent areas 112 which connect the defensive curve 204 to the body 100 of the pet toy and provide additional mass and thickness to the present invention. These tangent areas 112 can be dimensioned and angled to any particular measurement or degree that is most suited for the application described herein and can be adjusted in angle or thickness as desired.

For the defensive curves 108, where in the figures provided, it is understood that there are multiple defensive curves 108 located on the present invention, as well as existing on varied sizes of the present invention such as for small, medium and large pet toys. For different sizes and applications on different body 100 shapes, defensive curves 108 would be scaled up or down in size to be applicable for the particular pet toy size or shape to which they are applied.

The pet toys 10,20,30,40 with defensive deflection curves in use create less-effective purchase for the teeth of the animal, because the geometries in use deflect the chewing forces applied to the pet by the animal. When using the pet toys 10,20,30,40, a human can fill the cavity 102 with a food treat 114 and then present the toy to their pet. Using its teeth, the animal checks, licks or paws at the present invention to access the treats inside the cavity 102. Because as the animal bites the pet toy 10,20,30,40, the exterior edges 104 with defensive curves 108 deflect the chewing force of the animal, the pet toy 10,20,30,40 thus proves more durable than a pet toy without the defensive curves 108.

It can be appreciated that the systems and related shape geometry described herein may be used all together, separately, or in any combination. The systems may be used for pet toys, based on the use of the various components of the present invention.

Advantageously, the pet toys described herein address various needs by providing dog toy edges which are designed to be defensive and deflect the incoming bite forces of dogs across as many of the above listed variables as possible. With the correct defensive deflection curves for a dog chew toy shape, a lower grade and lower cost material may be used, in place of a material with a higher durable grade and cost, to achieve similar durability performance of the dog toy. In these respects, the pet toys with defensive deflection curves according to the present invention are believed to substantially depart from the conventional concepts and designs of the prior art, and in so doing provide an apparatus primarily developed for the purpose of providing dog toys with defensive deflection curves that can be used to render a dog chew toy that is durable when being subjected to the chew and bite forces of a dog.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. A hollow bone-type pet toy having defensive curves, comprising:
   (a) a body having a narrow mid-section and at least two hollow lobes extending therefrom;
   (b) wherein each lobe tapers outward from the narrow mid-section to a wide end;
   (c) wherein each lobe has walls defining an inner cavity;
   (d) wherein, in cross-section:
      (i) each lobe wall is thinnest adjacent the narrow mid-section and tapers outward in thickness such that the wall is thickest at a distal end of the respective lobe,
      (ii) at a distal end of an outer surface of each lobe wall, the outer surface terminates in a defensive deflection curve that extends around a distal end of the wall, and
      (iii) at a distal end of an inner surface of each lobe wall, the inner surface terminates in the defensive deflection curve such that the defensive deflection curve extends from the distal end of the inner surface around the distal end of the wall to the distal end of the outer surface;
   (e) wherein the defensive deflection curve is defined in two-dimensional space using a set of cubic Bézier curves; and
   (f) wherein, when a pet treat is placed in an inner cavity, teeth of a pet are deflected by the distal ends of the walls of the lobes when the pet bites the pet-toy while attempting to retrieve the pet treat from within the inner cavity.

2. The hollow bone-type pet toy of claim 1, wherein, in cross-section, the inner surface is a straight line that is tangential to the defensive deflection curve.

3. The hollow bone-type pet toy of claim 2, wherein, in cross-section, the outer surface defines a straight line that is tangential to the defensive deflection curve.

4. The hollow bone-type pet toy of claim 3, wherein, in cross-section, the outer surface defines a straight line from adjacent the narrow mid-section to its termination in the defensive deflection curve.

5. The hollow bone-type pet toy of claim 3, wherein, in cross-section:

(g) the straight line is a first straight line;

(h) the outer surface defines a second straight line from adjacent the narrow mid-section toward the distal end; and (i) the first straight line intersects the second straight line at a point.

6. The hollow bone-type pet toy of claim 5, wherein, in cross-section:

(j) the distal end of the of each lobe wall forms at least half of a circle having a diameter z;

(k) the second straight line, if extended, intersects the circle at a point; and (l) the thickness of the outer surface at the point where the second straight line intersects the circle is defined as 2*y, wherein z=3*y.

7. The hollow bone-type pet toy of claim 3, wherein, in cross-section, the outer surface is broken up by indentations.

8. The hollow bone-type pet toy of claim 1, wherein the inner cavities of the at least two hollow lobes are contiguous with each other.

9. The hollow bone-type pet toy of claim 1, wherein the inner cavities of the at least two hollow lobes are separate from each other and not contiguous.

10. The hollow bone-type pet toy of claim 1, wherein the body has four hollow lobes extending from the narrow mid-section.

11. The hollow bone-type pet toy of claim 1, wherein the set of defensive deflection curves, defined in two-dimensional space, uses the following two cubic Bézier curves:

$$x: = 59.6049(1-t)^3 + 68.5686*3(1-t)^2 t + 74.5537*3(1-t)^2 + 66.6693 t^3$$

$$y: = 40.1974(1-t)^3 + 42.0872*3(1-t)^2 t + 23.0612*3(1-t)^2 + 20.7629 t^3$$

12. The hollow bone-type pet toy of claim 1, wherein the set of defensive deflection curves, defined in two-dimensional space, uses the following two cubic Bézier curves:

$$x: = 50.4355(1-t)^3 + 57.2556*3(1-t)^2 t + 66.5792*3(1-t)^2 + 56.7791 t^3$$

$$y: = 26.7786(1-t)^3 + 27.7267*3(1-t)^2 t + 8.7196*3(1-t)^2 + 6.4401 t^3$$

13. The hollow bone-type pet toy of claim 1, wherein the set of defensive deflection curves, defined in two-dimensional space, uses the following two cubic Bézier curves:

$$x: = 44.0000(1-t)^3 + 57.1951*3(1-t)^2 t + 72.1087*3(1-t)^2 + 53.0000 t^3$$

$$y: = 27.6397(1-t)^3 + 44.2080*3(1-t)^2 t + 18.2645*3(1-t)^2 + 14.9310 t^3.$$

* * * * *